United States Patent [19]

Watanabe et al.

[11] Patent Number: 4,992,248

[45] Date of Patent: Feb. 12, 1991

[54] METHOD FOR NEUTRALIZING SULFURIC ACID CONTAINING ZINC ION

[75] Inventors: Morio Watanabe, Tokyo; Renpei Sei, Kanagawa, both of Japan

[73] Assignee: Solex Corporation of Japan, Tokyo, Japan

[21] Appl. No.: 392,129

[22] Filed: Aug. 10, 1989

[30] Foreign Application Priority Data

Aug. 19, 1988 [JP] Japan ................. 63-206030

[51] Int. Cl.$^5$ .......................................... B01D 11/00
[52] U.S. Cl. .......................................... 423/99; 423/70
[58] Field of Search ............... 423/70, 84, 81, 85, 423/83, 86, 139, 140, 143, 146, 147, 150, 492, 493, 608, DIG. 1, DIG. 2, 632, 390, DIG. 14, 101, 103, 109, 622; 75/101 R, 101 BE, 111; 210/688, 754

[56] References Cited

U.S. PATENT DOCUMENTS

| | | | |
|---|---|---|---|
| 3,067,010 | 12/1962 | Long et al. | 423/70 |
| 3,104,950 | 9/1963 | Ellis | 423/70 |
| 3,795,727 | 3/1974 | Yamamura et al. | 423/70 |

*Primary Examiner*—Peter D. Rosenberg

*Attorney, Agent, or Firm*—McAulay Fisher Nissen & Goldberg

[57] ABSTRACT

A method for neutralizing a sulfuric acid solution containing predominantly Zn ion, comprising adding, to the sulfuric acid solution, at least one compound selected from the group of chlorine-containing compounds of Na ion, K ion, Mg ion, Ca ion, and $NH_4$ ion in an amount at least chemically equivalent to $SO_4$ ion contained; and then bringing the sulfuric acid solution into contact with an organic solvent composed of one or more species selected from the group of oxygen-containing organic solvents and alkylamine organic solvents to extract Zn ion from the sulfuric acid solution as a chloride complex to the organic solvent. The sulfuric acid solution after extraction of Zn ion is further treated by addition of an oxidizing agent or by an electrochemical means to convert $Fe^{2+}$ into to $Fe^{3+}$ ion and is brought into contact with a second organic solvent B composed of one or more species selected from the group of oxygen-containing organic solvents and alkylamine organic solvents to extract Fe ion from the sulfuric acid solution as a second chloride complex to the second organic solvent B.

10 Claims, 5 Drawing Sheets

METHOD FOR NEUTRALIZING SULFURIC ACID CONTAINING ZINC ION

BACKGROUND OF THE INVENTION

1. Field of the Invention

The present invention relates to a method of refining zinc.

2. Description of the Related Art

Zinc smelting processes are roughly classified into dry methods and wet methods. In both methods, a sulfide of zinc, exemplified by sphalerite, is first roasted to separate into $SO_2$ gas and ZnO. The $SO_2$ gas evolved is recovered in the form of sulfuric acid, and the roasted ore containing ZnO is used as the starting material for zinc production both in the dry methods and in wet methods.

In dry methods, generally employed are New Jersey process employing a vertical retort, St. Joseph process employing vertical electrothermic distillation, and ISP process employing a blast furnace. In any of the processes, carbon such as coke is added to the ZnO-containing roasted ore, and it is heated to reduce the zinc oxide to metallic zinc, which is separated by volatilization and collected at a condenser. A higher purity of metallic zinc is produced by introducing the resulting distilled zinc into a rectification column to separate lead contained in the metallic zinc in a minute amount by utilizing the difference of the vapor pressure between zinc and lead.

In wet methods, the roasted ore containing ZnO is dissolved in sulfuric acid solution. Impurities such as Fe and Mn contained in the solution are separated by a pH separation process by adding alkali or by a jarosite process. Cd is separated from the $ZnSO_4$-containing solution by adding metallic zinc powder and causing substitution reaction based on the difference of ionization tendencies of the metal ions. The $ZnSO_4$ solution, having been subjected to various additional purification, is introduced finally to an electrolysis step.

In the electrolysis step, a large quantity of electrolytic solution is withdrawn for keeping water balance and $H_2SO_4$ balance, because, in the electrolysis step, $H_2SO_4$ concentration increases due to deposition of ZnO, the Mn ion still remaining after the purification of the solution is required to be removed, and the Na ion concentration have to be kept low. The drawn-out electrolytic solution is recycled for leaching out ZnO from the aforementioned roasted ore to remove impurities.

Such smelting of zinc according to wet methods is disadvantageous in many points. The acid concentration in the raw material solution has to be kept low owing to the necessity of using a purified electrolytic solution for dissolution of the raw material, and special care should be taken for roasting sphalerite ore so as not to cause the decrease of leaching rate. The raw materials are restricted and oxide ores or silicate ores containing higher content of impurity compared with sphalerite cannot be used by the reason that use of NaOH, $Na_2CO_3$ and the like for pH separation on purification of the recycling $ZnSO_4$ solution induces the increase of Na ion concentration in the solution, causing adverse effects on electrolysis and use of Ca-containing substance such as $Ca(OH)_2$ or $CaCO_3$ causes formation of gypsum which increases the loss of Zn. $ZnO \cdot Fe_2O_3$ or the like, if it is formed on roasting sphalerite, requires the use of dilute acid for dissolution. The purification of the recycled liquid will cost much in the case where raw materials containing Fe in higher content than Zn is used. In consideration of industrial wastes as a zinc source other than the natural resources, the zinc content in iron scrap is becoming higher with the increased consumption of zinc-galvanized sheet iron, which causes the increase of zinc content in the wastes, such as remarkable rise of the zinc content in the dusts exhausted from electric furnaces or steel converters using iron scrap, preventing direct recycle of the dust to a blast furnace, resulting in intermixing of Zn in metallic Fe or formation of involatile Zn-ferrite in oxidative atmosphere, and thus complete separation of Zn is extremely difficult even though a method is practiced in which iron raw material is produced by heating in a rotary kiln with a reducing agent such as coke to separate Zn by reduction volatilization and weak reduction of iron. Moreover, the ZnO volatilized and collected has a zinc content as low as 30 to 40% in many cases, so that the ZnO cannot be sold to zinc refineries as a zinc material but is transferred to them with paying expense without additional value to the products.

Further, in case where Zn-containing material is dissolved in a strong acid, though the restriction on the raw materials is lessened and the amount of insoluble matter is decreased, economical production of zinc is not feasible because the neutralization of the acid employed is costly.

SUMMARY OF THE INVENTION

The present invention intends to eliminate the above discussed disadvantages.

According to an aspect of the present invention, there is provided a method for neutralizing a sulfuric acid solution containing predominantly Zn ion, comprising adding, to the sulfuric acid solution, at least one compound selected from the group of chlorine-containing compounds of Na ion, K ion, Mg ion, Ca ion, and $NH_4$ ion in an amount at least chemically equivalent to $SO_4$ ion contained; and then bringing the sulfuric acid solution into contact with an organic solvent composed of one or more species selected from the group of oxygen-containing organic solvents and alkylamine organic solvents to extract Zn ion from the sulfuric acid solution as a chlorine compound to the organic solvent.

According to another aspect of the present invention, there is provided a method for neutralizing a sulfuric acid solution containing predominantly Zn ion and Fe ion and additionally one or more metallic ions co-existing therein, comprising a first step of adding, to the sulfuric acid solution, at least one compound selected from the group of chlorine-containing compounds of Na ion, K ion, Mg ion, Ca ion, and $NH_4$ ion in an amount at least chemically equivalent to $SO_4$ ion contained; and then bringing the sulfuric acid solution into contact with a first organic solvent A composed of one or more species selected from the group of oxygen-containing organic solvents and alkylamine organic solvents to extract Zn ion from the sulfuric acid solution as a chlorine compound to the organic solvent A; and a second step of converting $Fe^{2+}$ ion to $Fe^{3+}$ ion in the raffinate sulfuric acid solution from the first step by addition of an oxidizing agent or by an electrochemical means, and then bringing the raffinate sulfuric acid solution into contact with a second organic solvent B composed of one or more species selected from the group of oxygen-containing organic solvents and alkylamine organic solvents to extract Fe ion from the sulfuric acid solution to the second organic solvent B.

DETAILED DESCRIPTION OF THE PREFERRED EMBODIMENT

Figure 1:
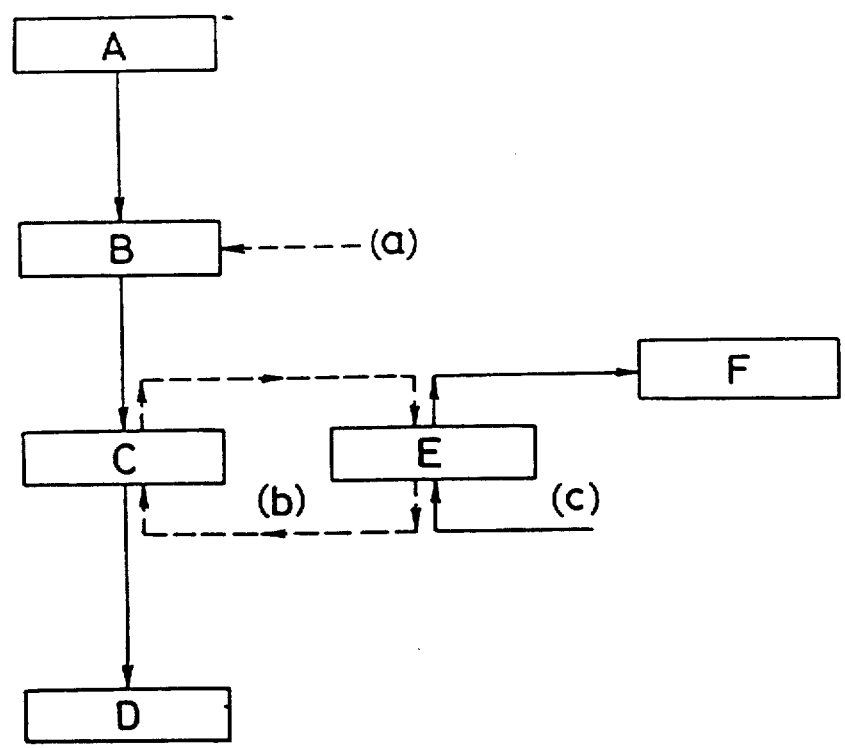
FIG. 1 shows a flow sheet illustrating a basic type of operation of the present invention.

The present invention relates to neutralization of sulfuric acid predominantly containing Zn ion without using $NH_3$, $NH_4OH$, $Na_2CO_3$, or NaOH which are expensive alkalis, or a Ca compound such as $Ca(OH)_2$ and $CaCO_3$ which forms gypsum as a by-product to decrease the recovery of Zn. The present invention relates to a method for neutralizing sulfuric acid that contains predominantly Zn ion and a method for converting the Zn ion into zinc oxide, zinc metal, or zinc salts such as zinc chloride in high purity with the aid of an inexpensive chlorine compound such as a compound of Na and Cl represented by rock salt distributed widely on the earth, or a compound of Mg and Cl, K and Cl, Ca and Cl, or $NH_4$ and Cl which is discharged as industrial wastes in large amount.

The starting material for the present invention, namely a sulfuric acid that contains predominantly Zn ion, may be obtained by treatment of sphalerite with sulfuric acid or water to make a slurry and then bringing the slurry into contact with an oxygen-containing gas under a normal pressure or a high pressure to prepare a solution, or otherwise by using the sphalerite as an anode in electrolysis to dissolve it, or from industrial waste of electric furnace dust or converter dust by treatment with sulfuric acid or a combination of sulfuric acid and rock salt. The raw material is not restricted in the present invention.

In the present invention, the starting material may be obtained by treating sphalerite with $H_2SO_4$ or water to make a slurry and by oxidizing ZnS by adding an oxygen containing gas under a normal pressure or high pressure according to the formula below:

$$ZnS + 2O_2 \rightarrow ZnSO_4$$

$$ZnS + ZnO + H_2SO_4 + 2O_2 \rightarrow 2ZnSO_4 + H_2O$$

In another method, sphalerite is added to an aqueous solution containing a compound of Na and Cl, a compound of $NH_4$ and Cl, a compound of Mg and Cl, or a compound of K and Cl to make a slurry, which is introduced to a reactor under normal pressure or a high pressure with an oxygen-containing gas to make a solution. Instead, the solution may be prepared by use of sphalerite as an anode in electrolysis.

$$ZnS + 2NaCl + 2O_2 \rightarrow ZnCl_2 + Na_2SO_4$$

$$ZnS + ZnO + 2NaCl + H_2SO_4 + 2O_2$$

$$\rightarrow ZnCl_2 + ZnSO_4 + Na_2SO_4 + H_2O$$

In a still another method, a natural oxide ore or a solid containing ZnO or $ZnO.Fe_2O_3$ exemplified by industrial waste as electric furnace dust or converter dust is treated with sulfuric acid solely or a mixture of sulfuric acid with a compound of an alkali metal and chlorine such as rock salt according to the reaction shown by the formulas below to prepare the starting raw material.

$$ZnO + H_2SO_4 + 2NaCl$$

$$\rightarrow ZnCl_2 + Na_2SO_4 + H_2O$$

$$FeO + H_2SO_4 + 2NaCl$$

$$\rightarrow FeCl_2 + Na_2SO_4 + H_2O$$

In neutralization of the starting material, namely a sulfuric acid solution containing Zn ion thus obtained, the use of NaOH or $Na_2CO_3$ is uneconomical because of high cost of the alkali. Although the use of $Ca(OH)_2$ or $CaCO_3$ is inexpensive, it remarkably lowers the recovery rate of zinc because of the formation of gypsum and adsorptive coprecipitation thereof with Zn ion in the solution.

The use of HCl as the acid is also uneconomical and disadvantageous because of the high cost of the acid in spite of reduction of the neutralization cost.

In the present invention, sulfuric acid which contains Zn ion is neutralized by adding thereto at least one of the compounds selected from the group of a compound of Na and Cl, a compound of Mg and Cl, a compound of K and Cl, and a compound of $NH_4$ and Cl; and subsequently bringing it into contact with an organic solvent comprising the one or more selected from the group consisting of oxygen-containing solvents and alkylamines to extract the Zn ion from the sulfuric acid solution to the organic phase (organic solvent).

$$ZnSO_4 + H_2SO_4 + 4NaCl + Org$$

$$\rightarrow H_2ZnCl_4.Org + 2Na_2SO_4$$

$$ZnSO_4 + H_2SO_4 + 4NH_4Cl + Org$$

$$\rightarrow H_2ZnCl_4.Org + 2(NH_4)_2SO_4$$

$$ZNSO_4 + H_2SO_4 + 4KCl + Org$$

$$\rightarrow H_2ZnCl_4.Org + 2K_2SO_4$$

$$ZNSO_4 + H_2SO_4 + 2MgCl_2 + Org$$

$$\rightarrow H_2Zncl_4.Org + 2MgSO_4$$

It should be noted that the above formulas illustrate typical examples of the reactions in the extraction, and that the chemical species will change depending on the $SO_4$ concentration, Cl concentration, and co-existing metal ions and their concentration, and kind of the organic solvent.

For example, when an organic solvent having a high basicity, such as TOPO (trioctylphosphine oxide) is used, the amount of the compound of Na and Cl, K and Cl, Mg and Cl, or NH$_4$ and Cl has to be controlled depending on the kind of organic solvent so that the extracted species may undergo the following reactions.

$$ZnSO_4 + 2NaCl + Org$$

$$\rightarrow ZnCl_2.Org + Na_2SO_4$$

$$ZnSO_4 + 2NH_4Cl + Org$$

$$\rightarrow ZnCl_2.Org + (NH_4)_2SO_4$$

In the case where both Zn ion and Fe ion are contained, Fe$^{2+}$ ion is preferably oxidized to Fe$^{3+}$ ion after the chloride complex of Zn is extracted since the extraction partition ratio in generally in the order of Zn > Fe$^{3+}$ > Fe$^{2+}$ although it depends on the organic solvent.
ti $ZnSO_4 + FeSO_4 + 4NaCl + Org$ $$\rightarrow ZnCl_2.Org + FeCl_2 + 2Na_2SO_4$$

$$ZnSO_4 + FeSO_4 + 2MgCl_2 + Org$$

$$\rightarrow ZnCl_2.Org + FeCl_2 + 2MgSO_4$$

Since the partition ratios tend to increase with the increase of the total chlorine concentration in the sulfuric acid, the chlorine concentration should preferably be controlled to the level necessary for extracting the chloride complex of Zn for the separation of Fe ion and Zn ion.

$$ZnSO_4 + FeSO_4 + 2NH_4Cl + Org$$

$$\rightarrow ZnCl_2.Org + FeSO_4 + Na_2SO_4$$

$$ZnSO_4 + FeSO_4 + 2KCl + Org$$

$$\rightarrow ZnCl_2.Org + FeSO_4 + Na_2SO_4$$

For oxidation of Fe ion in the present invention, various oxidizing agents are of course useful such as HNO$_3$, NaNO$_3$, NH$_4$NO$_3$, NaClO, NaClO$_3$, and CaCl$_2$Ca(ClO)$_2$ as well as H$_2$O$_2$, Cl$_2$, and high-pressure oxygen, and further, an electrochemical oxidation process may also be used.

After the chloride complex of Zn is removed by extraction, Fe ion may be oxidized, and at least one compound may be added which is selected from the group of the chlorine compounds of Na, K, NH$_4$ and Mg that is necessary for neutralizing the sum of the free SO$_4$ ion and Fe-bonded SO$_4$ ion contained in the extracted raffinate.

$$Fe_2(SO_4)_3 + H_2SO_4 + 4MgCl_2 + Org$$

$$\rightarrow 2HFeCl_4.Org + 4MgSO_4$$

$$Fe_2(SO_4)_3 + H_2SO_4 + 8NaCl + Org$$

$$\rightarrow 2HFeCL_4.Org + 4Na_2SO_4$$

$$Fe_2(SO_4)_3 + H_2SO_4 + 8KCl + Org$$

$$\rightarrow 2HFeCl_4.Org + 4K_2SO_4$$

It should be noted that, as the extracted species of the chloride complex of zinc is not definite, the extracted chemical species in the organic phase also depends on the conditions of the aqueous solution and the kind of the extracting solvent. In the case where an extracting solvent having higher basicity is used such as alkylphosphine oxide, the extracted species tends to increase.

$$Fe_2(SO_4)_3 + 6NaCl + Org$$

$$\rightarrow 2FeCl_3.Org + 3Na_2SO_4$$

$$Fe_2(SO_4)_3 + 6NH_4Cl + Org$$

$$\rightarrow 2FeCl_3.Org + 3(NH_4)_2SO_4$$

$$Fe_2(SO_4)_3 + 6KCl + Org$$

$$\rightarrow 2FeCl_3.Org + 3K_2SO_4$$

$$Fe_2(SO_4)_3 + 3MgCL_2 + Org$$

$$\rightarrow 2FeCl_3.Org + 3MgSO_4$$

The chloride complexes of Fe and Zn having been extracted from the organic solvent are transferred to the aqueous phase by contact of the organic solvent with water as Zn ion and Cl ion; and Fe ion and Cl ion, while the organic solvent is regenerated.

$$H_2ZnCl_4.Org + Water \rightarrow Org + ZnCl_2 + 2HCl$$

$$ZnCl_2.Org + Water \rightarrow Org + ZnCl_2$$

$$HFeCl_4.Org + Water \rightarrow Org + FeCl_3 + HCl$$

$$FeCl_3.Org + Water \rightarrow Org + FeCl_3$$

Co-existing TiOCl$_2$, FeCL$_3$, FeCl$_2$,HNO$_3$, etc. may sometimes co-extracted in the extraction of the chloride complex of Zn. The impurities other than Zn ion and Cl ion are eliminated by contact with aqueous solution containing one or more compounds selected from a compound of Na and Cl, a compound of NH$_4$ and Cl, a compound of K and Cl, a compound of Mg and Cl, and a compound of Zn and Cl.

$$ZnCl_2.Org + FeCl_3.Org + NaCl + ZnCl_2$$

$$\rightarrow 2ZnCl_2.Org + NaCl + FeCl_3$$

$$ZnCl_2.Org + TiOCl_2Org + ZnCl_2 + KCl$$

$$\rightarrow 2ZnCl_2.Org + TiOCl_2 + KCl$$

$$2ZnCl_2.Org + HNO_3.Org + NH_4Cl + ZnCl_2$$

$$\rightarrow 2ZnCl_2.Org + NH_4Cl + HNO_3$$

HNO$_3$ is co-extracted in the extraction of the chloride complex of Fe in the case where a nitrate salt such as HNO$_3$, NaNO$_3$, NH$_4$NO$_3$, etc. is used for oxidation of Fe ion.

The co-extracted HNO$_3$ is transferred to an aqueous solution upon contact with the aqueous solution containing one or more of the compounds selected form the group of a compound of Na and Cl, a compound of Mg and Cl, a compound of NH$_4$ and Cl, a compound of K and Cl, and a compound of Fe and Cl. The HNO$_3$ is recovered as a concentrated solution which is recycled to the output from the first step for oxidation of Fe ion.

$FeCl_3.Org + HNO_3.Org + NaCl \rightarrow FeCl_3$ $\rightarrow 2FeCl_3.Org + HNO_3 + NaCl$ $FeCl_3.Org + HNO_3.Org + NH_4Cl + FeCl_3$ $\rightarrow 2FeCl_3.Org + HNO_3 + NH_4Cl$ $FeCl_3.Org + HNO_3.Org + FeCl_3$ $\rightarrow 2FeCl_3.Org + HNO_3$ As understood from the above formulas, $HNO_3$ having an extraction partition ratio lower than that of $FeCl_3$ is transferred from the organic phase to the aqueous phase. Similarly, impurity ions and impurity complex ions having a lower extraction partition ratio than $HNO_3$ are also transferred to the aqueous phase, leaving purified Fe in the organic phase.

The method for recovering zinc is optional in the present invention, and is diversified. Accordingly, the product may be any of zinc oxide, zinc chloride, and zinc metal in consideration of the practice of the present invention.

In some known processes of zinc recovery to be combined with the present invention, Cd ion is contained in the liquid containing Zn ion and Cl ion inversely extracted from the organic solvent A in the first step. The Cd ion is removed generally by adding zinc powder to the aqueous solution and thus forming metallic Cd according to the difference in ionization tendencies.

$CdCl_2 + ZN^* \rightarrow ZnCl_2 + Cd^*$

The solution containing the inversely extracted Zn and Cl contains less amount of free HCl, so that the addition of zinc powder and a small amount of Ca(OH)$_2$ gives the pH of the solution where the extraction with an organic solvent containing an alkyl ester of a phosphorus-containing acid is feasible.

The extraction of Zn ion by an organic solvent containing an alkyl ester of a phosphorus-containing acid depends on the exchange of $H^{30}$ ion as shown in the formula below:

$ZnCl_2 + 2RH \rightarrow ZnR_2 + 2HCl$ where RH is an organic solvent having an H type exchangeable group.

In the organic solvent A, the chloride complex of $Fe^{3+}$ extracted together with the chloride complex of Zn may possibly behave in the same manner as Zn ion. Therefore, the Fe ion may be contained in the $ZnCl_2$-containing inverse extraction liquid, and the Fe ion is required to be separated from the Zn.

Upon contact with the organic solvent C containing an alkyl ester of a phosphorus-containing acid, $Fe^{3+}$ ion is extracted in preference to Zn ion, which makes difficult the separation by selecting extraction conditions.

$FeCl_3 + 3RH \rightarrow FeR_3 + 3HCl$

The separation of Zn ion from $Fe^{3+}$ ion can be achieved by the inverse extraction described below:

The Zn ion extracted to the organic phase is transferred to aqueous phase upon contact with an acid as shown in the formulas below, while Fe ion does not.

$ZnR_2 + H_2SO_4 \rightarrow ZnSO_4 + 2RH$ $ZnR_2 + 2HNO_3 \rightarrow Zn(NO_3)_2 + 2RH$ $ZnR_2 + 2HCl \rightarrow ZnCl_2 + 2RH$ On the other hand, $Fe^{3+}$ ion is transferred to an aqueous phase upon contact with aqueous solution containing $NH_4F$ or $NH_4HF_2$, while Zn does not at all. Thus Zn ion can be separated from $Fe^{3+}$ ion.

$FeR_3 + 3NH_4HF_2 \rightarrow (NH_4)_3FeF_6 + 3RH$

The oxidizing agent employed in the optional step of the present invention includes $HNO_3$, $NaNO_3$, $NH_4NO_3$, NOx compounds such as NOx, oxidizing agents containing both Na and Cl such as NaClO and $NaClO_3$, and $H_2O_2$ etc., and furthermore an electrochemical means may be applicable for converting $Fe^{2+}$ ion to $Fe^{3+}$ ion.

The compounds containing Na and Cl used in the present invention may be NaCl such as rock salt, or other compounds such as NaClO and $NaClO_x$. Liquid mixtures like seawater may be used in place of the compound. As the compounds containing Ca and Cl, oxidants containing Ca and Cl such as $CaCl_2.Ca(ClO)_2$ as well as calcium chloride ($CaCl_2$) which is discharged as industrial waste in large amounts may be used.

As the compounds containing $NH_4$ and Cl, the by-product produced in ammonia industries in a large amount and partially discarded as industrial waste may be used in the present invention in a similar way to the compounds such as $MgCl_2$ and KCl.

The organic solvent A and B, (namely oxygen-containing organic solvents or alkylamine organic solvents) are selected from the groups below:

(a) Ethers:

Aliphatic simple ethers, aliphatic mixed ethers, aliphatic unsaturated ethers and aromatic ethers, including diisoamyl ether, diethyl ether, diisopropyl ether and other ethers analogous thereto.

(b) Ketones:

Ketones represented by the formula:

$$\begin{matrix} R \\ \phantom{x} \\ R' \end{matrix} \!\! \diagdown \!\! C = O$$

where R and R' denote respectively an alkyl or aryl radical having 2 to 18 carbons, such as methyl isobutyl ketone, methyl propyl ketone, methyl amyl ketone, cyclohexanone, methylcyclohexanone and other ketones analogous thereto.

(c) Esters:

Esters of phosphorus-containing acids represented by the formulas below:

$$R_1O-\overset{\overset{O}{\|}}{P}-OR_3, \; R_1O-\overset{\overset{O}{\|}}{P}-R_3, \; R_1O-\overset{\overset{O}{\|}}{P}-R_3, \text{ and } R_1-\overset{\overset{O}{\|}}{P}-R_3$$
$$\phantom{R_1O-}OR_2 \phantom{xxx} OR_2 \phantom{xxxxx} R_2 \phantom{xxxxxx} R_2$$

where $R_1$, $R_2$, and $R_3$ represent respectively an alkyl or aryl radical having 4 to 18 carbons, and the alkyl or aryl groups may be the same or different (namely $R_1 \neq R_2 \neq R_3$, or $R_1 \neq R_2 \neq R_3$)

(d) Amides:

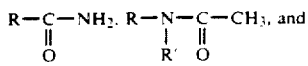

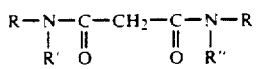

where R, R', and R" are respectively an alkyl or aryl radical having 2 to 18 carbons.

(e) Alcohols:

Alcohols (primary, secondary, and tertiary) having 4 to 18 carbons.

(f) Alkylamines:

Primary, secondary and tertiary alkylamines having 4 to 24 carbons.

The organic solvent C used in the present invention is selected from the group of the alkyl esters of phosphorus-containing acids below:

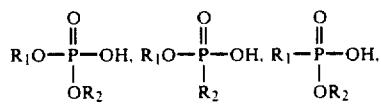

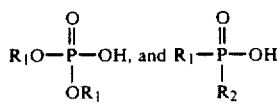

where $R_1$ and $R_2$ are respectively an alkyl or aryl radical having 4 to 18 carbons, and $R_1$ and $R_2$ may be the same or $R_1 \neq R_2$.

The petroleum hydrocarbon used for diluting the extraction agent may be an aromatic hydrocarbon, an aliphatic hydrocarbon, or a mixture thereof. A hydrocarbon mixture such as kerosine is also useful.

The present invention is described in more detail referring to the drawings. However, it does not limit the present invention.

FIG. 1 is a flow sheet illustrating the basic type of operation of the present invention. A sulfuric acid solution A containing Zn ion is introduced to the chloridization step B, where a compound (a) of Na and Cl, Ca and Cl, K and Cl, Mg and Cl, or $NH_4$ and Cl is added to the solution to change the Zn ion to the chloride. Then the solution is introduced to the extraction step C, where the solution is brought into contact with an organic solvent (b) comprising one or more of the solvent selected from the group of oxygen-containing organic solvents and elkylamines to extract Zn ion from the sulfuric acid solution to the organic solvent as an chloride complex, leaving the sulfuric acid solution after the Zn extraction as the raffinate D.

The zinc chloride complex ion transferred to the organic phase is subsequently brought into contact with water (c) in the inverse extraction step E, and the Zn ion and Cl ion in the organic phase is inversely extracted to the aqueous solution F with regeneration of the organic solvent (b) comprising one or more organic solvents selected from the group of oxygen-containing organic solvents and alkylamines.

The inversely extracted Zn-containing aqueous solution may be concentrated without further treatment and be sold on the market as zinc chloride. Otherwise zinc hydroxide may be prepared from it by pH adjustement, and the zinc hydroxide may be fired into zinc oxide which may be sold for pigment use.

Figure 2:
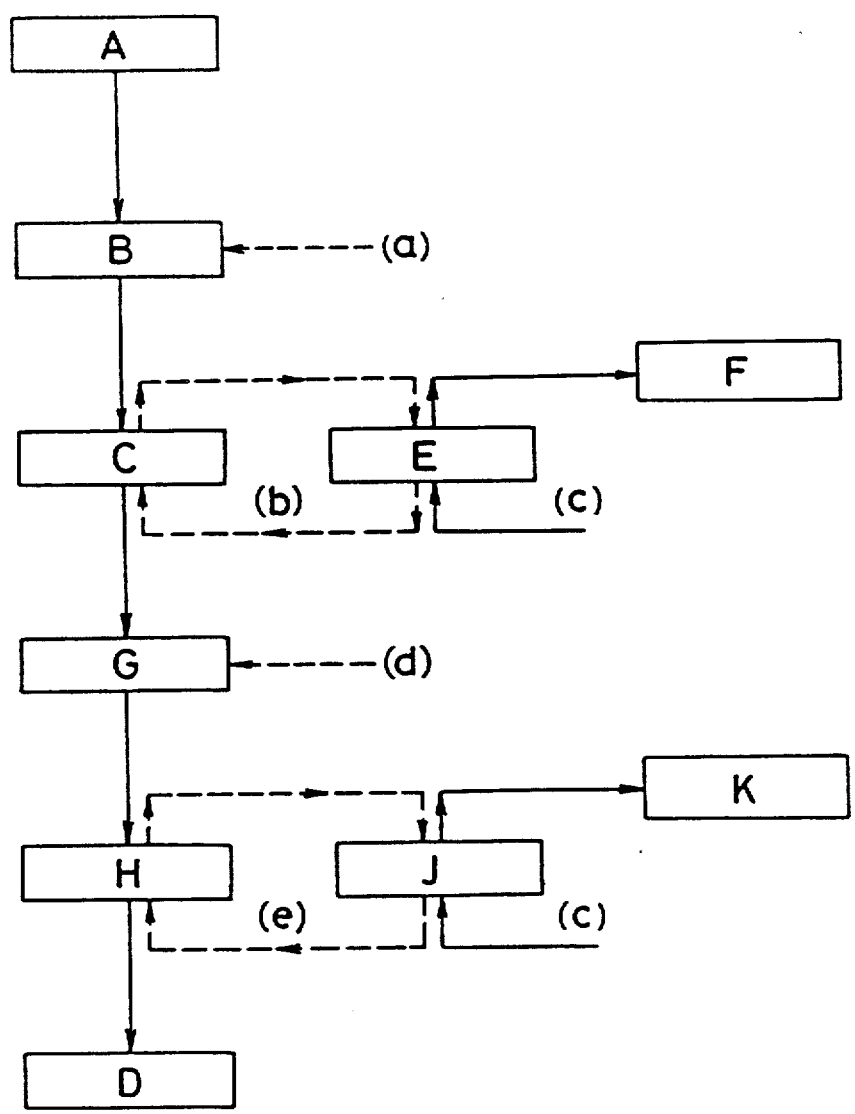
FIG. 2 shows a basic type of the present invention for treating a sulfuric acid solution containing both Zn ion and Fe ion.

FIG. 2 is a flow sheet illustrating a basic type of treatment of sulfuric acid containing solution A which contains both Zn ion and Fe ion. In the first step, the sulfuric acid containing solution A is introduced to the chloridization step B and the chloride complex of Zn is extracted therefrom, which is similar to the step shown in FIG. 1. The raffinate after Zn extraction is introduced to the Fe ion oxidation step G where $Fe^{2+}$ ion is conveted to $Fe^3$ ion by addition of an oxidizing agent (d) or by electrochemical means. Then it is treated in the step H for extracting the chloride complex of iron by contact with an organic solvent (e) comprising one or more organic solvents selected from the group of oxygen-containing solvents and alkylamines, with Fe ion extracted from the sulfuric solution to the organic solvent (e) to leave the sulfuric acid solution as an extraction raffinate D.

The iron chloride complex ion transferred to the organic phase is subsequently brought into contact with water (c) in the inverse extraction step J, and the Fe ion and the Cl ion in the organic phase are inversely extracted to the aqueous solution K with regeneration of the organic solvent (e).

The aqueous solution K containing inversely extracted Fe comprises iron chloride, which may be sold for use as an etching agent. The solution K may also be neutralized in the optional iron recovery step of the present invention with an inexpensive Ca-containing material such as $Ca(OH)_2$ to prepare iron hydroxide since the solution contains no sulfuric acid. The resulting iron hydroxide has high purity, and fired into iron oxide or decomposed in an reductive atmosphere easily into metallic iron which may be sold for electronic use or for pigment use.

The solution having been neutralized by $Ca(OH)_2$, etc. comprises $CaCl_2$ without precipitate such as gypsum. This process is a method of neutralization of sulfuric acid solution containing mainly Zn ion and Fe ion.

Figure 3:
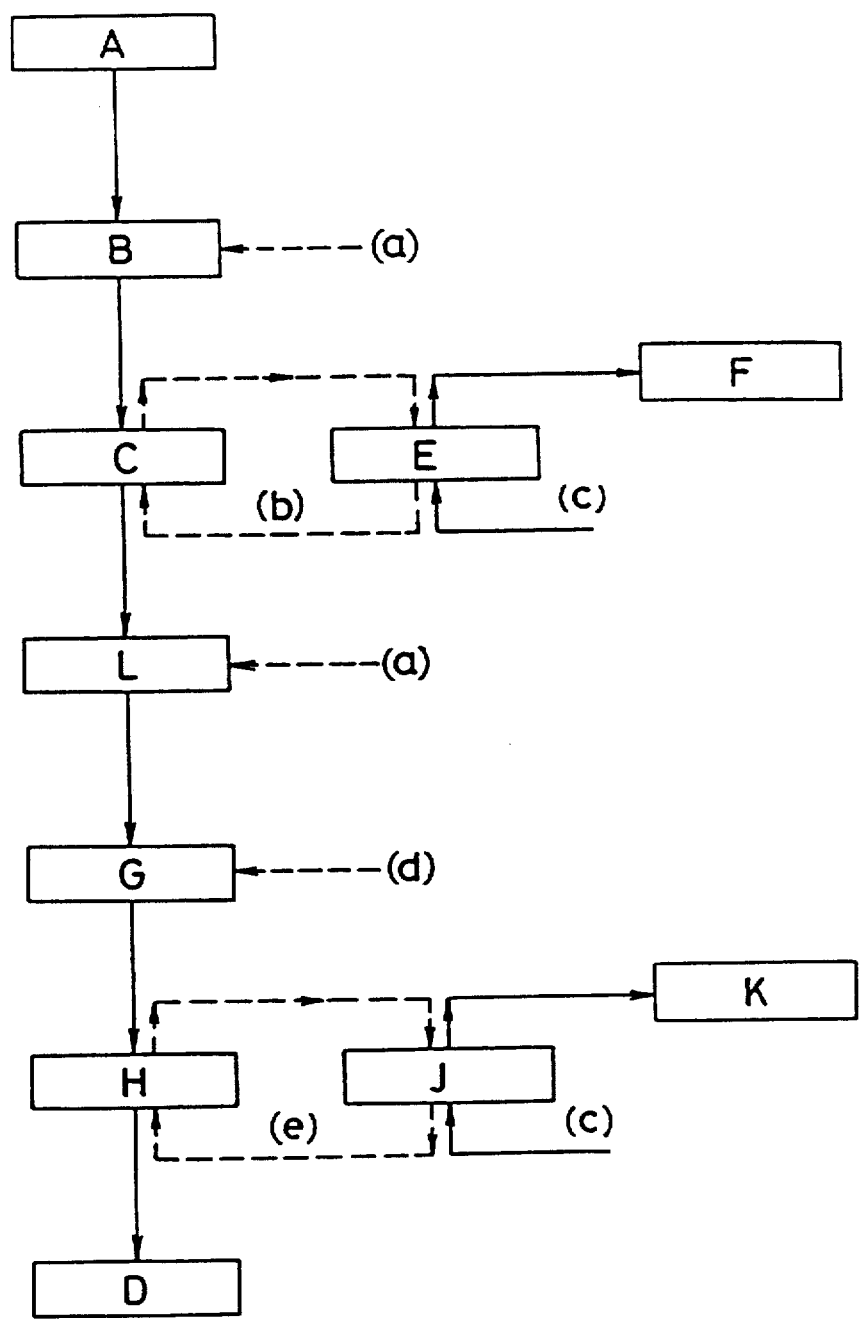
FIG. 3 and FIG. 4 illustrate basic operations of the embodiment of the addition of a Cl compound of Na, K, $NH_4$, Mg, or Ca for the purpose of oxidation of Fe ion or chloridization of Zn ion and Fe ion.

FIG. 3 shows a flow sheet which is basically the same as those in FIG. 1 and FIG. 2. In FIG. 3, the amount of the compound (a) of Na and Cl, Mg and Cl, Ca and Cl, K and Cl, or $NH_4$ and Cl to be added in the chloridization step B is controlled to the level which is sufficient for formation of a chloride complex of Zn but hinders the formation of a chloride complex of Fe. Subsequently, the raffinate from the first step is introduced to the step L for chloridization of the Fe ion contained therein. In this step L, a chlorine compound of Na ion, K ion, Mg ion, Ca ion, or $NH_4$ ion is added to the raffinate in an amount chemically equivalent to the sum of free $SO_4$ ion and combined $SO_4$ ion with Fe ion in the raffinate. Thus in FIG. 3, the chloridization step is divided into two steps, which is the difference from FIG. 1 and FIG. 2.

Figure 4:
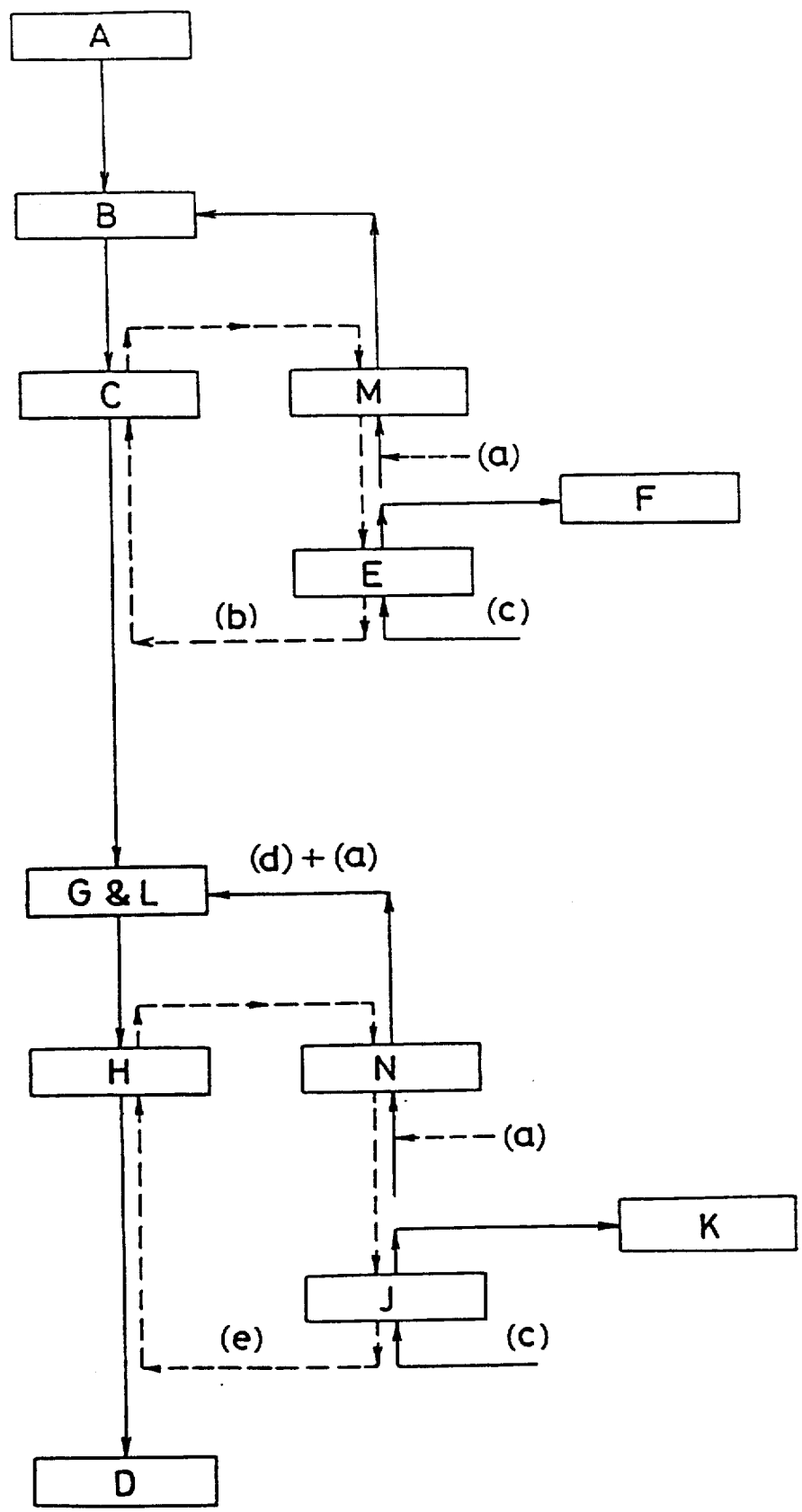

FIG. 4 is a flow sheet similar to FIG. 3. However, in FIG. 4, in the first step, a washing step M is provided where organic solvent (b) containing the extracted chlorine complex of Zn is brought into contact with an aqueous solution containing one or more of the compounds of Na and Cl, $NH_4$ and Cl, K and Cl, Mg and Cl, or Zn and Cl before the organic solvent is introduced to the inverse extraction step E to remove any co-extracted impurity from the organic phase. Further, in the second step, the Fe-ion oxidation step G and the chloridization step L is combined into one step G & L by using as oxidizing agent an $NO_3$-containing substance such as $HNO_3$, $NaNO_3$, and $NH_4NO_3$. In $HNO_3$ recovery step N for recovering the co-extracted $HNO_3$ by washing and transfer to aqueous solution before the organic solvent (e) containing extracted chloride complex of Fe is led to the inverse extraction step J, a step is provided in which the organic solvent is brought into contact with an aqueous solution which contains one or more of compounds of Na and Cl, Mg and Cl, K and Cl, NH4 and Cl, or Fe and Cl.

Figure 5:
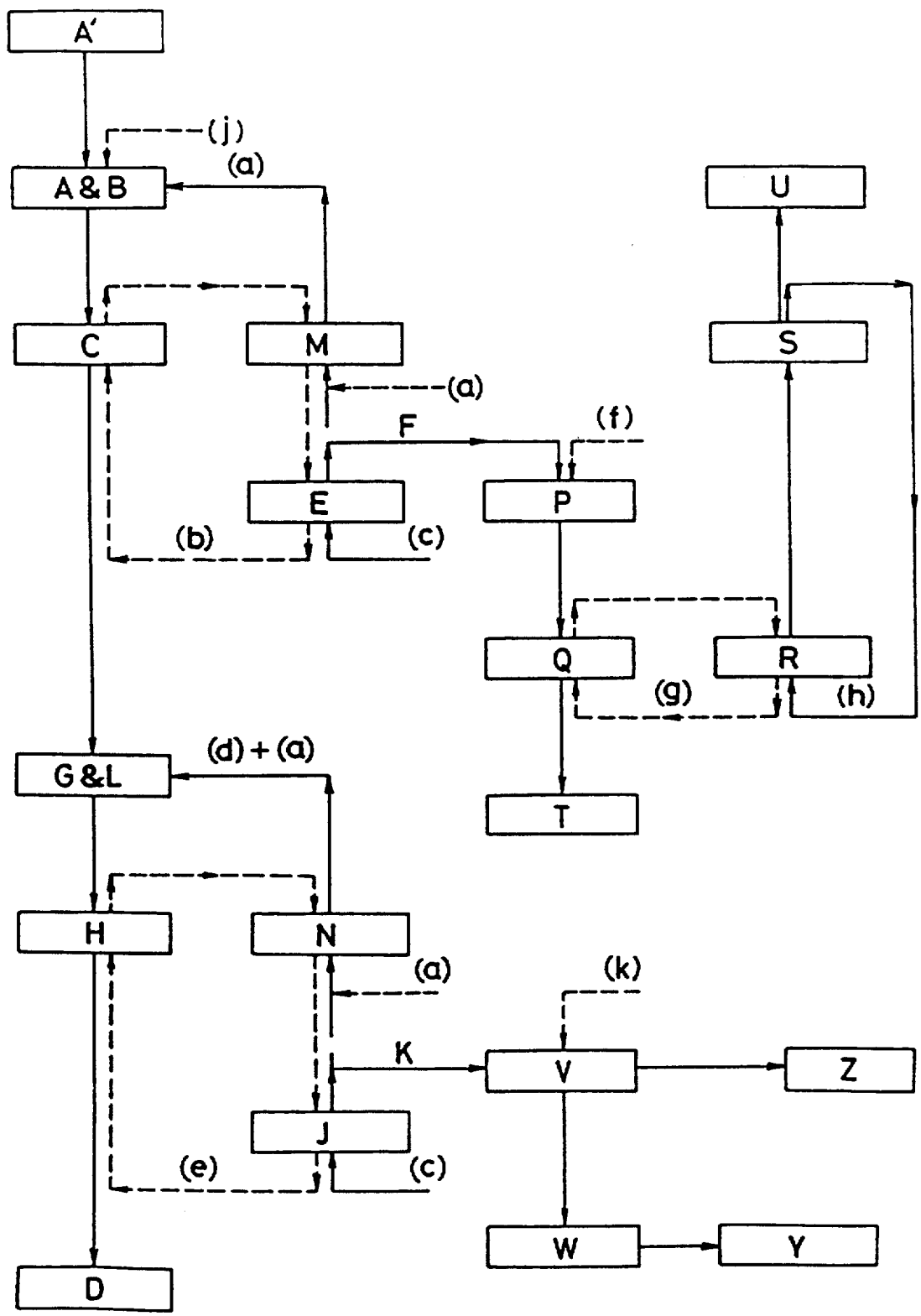
FIG. 5 is a flow sheet with additional basic operation of producing a sulfuric acid solution predominantly containing Zn ion and Fe ion, incorporating a process of producing a starting material from an industrial waste or naturally produced raw materials by using an autoclave, an electrolytic cell and an ordinary pressure dissolving tank.

FIG. 5 is a flow sheet similar to FIG. 4. However, in FIG. 5, for preparing a sulfuric acid solution containing predominantly Zn ion and Fe ion together with a variety of metal ions, a step is provided in which a sulfide of zinc represented by sphalerite is treated with water of sulfuric acid to give a slurry and then it is turned to a solution by addition of an oxygen-containing gas (j). In this step, substance (a) containing a compound of chlorine with an alkali emtal, or an alkaline earth metal such as Na and Cl, Mg and Cl, K and Cl, and NH4 and Cl is added with water or sulfuric acid for dissolution, and thus the chloridization of the step B and the preparation of the Zn-ion containing solution are simultaneously conducted. Furthermore, in FIG. 5, a step for recovery of Zn is added which is an optional step in the present invention.

The inverse extraction liquid F which has inversely extracted Zn ion and Cl ion and composed of zinc chloride is introduced to step P where Cd ion, etc. are removed by adjustment of pH or by ionization tendency where a neutralizing agent or zinc powder (f) such as $Ca(OH)_2$ and $Zn(OH)_2$ is added. Thereafter the liquid is introduced to Zn ion extraction step Q where the liquid is brought into contact with an organic solvent (g) containing an alkyl ester of a phosphorus-containing acid to extract Zn ion in the liquid to the organic phase. The raffinate T is neutralized with $Ca(OH)_2$ and discharged to the river.

The Zn ion extracted to the organic solvent (g) containing an alkyl ester of a phosphorus-containing acid is inversely extracted to an electrolyte solution (h) coming from an electrolysis step S upon contact of the organic phase with the electrolyte solution, and the organic solvent is regenerated.

The inverse extraction liquid is recycled to the electrolytic step S where metallic zinc is obtained.

The examples of the present invention are shown below.

EXAMPLE 1

A liquid having the composition shown in Table 1 was prepared. An experiment was conducted to extract the chloride complex of Zn, and to roughly neutralize the sulfuric acid.

TABLE 1

| Starting Solution of Zn Extraction Unit: g/l | | | |
|---|---|---|---|
| Total $H_2SO_4$ | Total Na | Total HCl | Zn |
| 101.2 | 47.5 | 74.3 | 50.9 |

The organic solvent and the extraction conditions employed are as below:

TOPO (trioctylphosphine oxide) dissolved in kerosine was brought into contact in countercurrent with the starting solution shown in Table 1 by means of separating funnels.

O/A = 1.6/1.0
Number of contact steps: 6, countercurrent
Shaking time: 5 minutes
Temperature: 25°-28° C Table 2 shows the results.

TABLE 2

| | Zn Raffinate | | | |
|---|---|---|---|---|
| | Unit: g/l | | | |
| | Total $H_2SO_4$ | Total Na | Total HCl | Zn |
| Organic Phase | 0.3 | <0.001 | 38.9 | 31.8 |
| Aqueous Phase | 106.8 | 47.5 | 12.1 | <0.001 |

The resultant organic solvent was brought into contact with water to inversely extract Zn ion and Cl ion for continuous countercurrent contact test. Table 3 shows the results.

O/A = 1.4/1.0
Inverse extracting agent: clear water
10-stage countercurrent contact
Contact time: 5 minutes
Temperature: 40°-45° C

TABLE 3

| | Inverse Extraction of Chloride Complex of Zinc | | | |
|---|---|---|---|---|
| | Unit: g/l | | | |
| | Total $H_2SO_4$ | Total Na | Total HCl | Zn |
| Organic Phase | <0.001 | <0.001 | 0.9 | 0.8 |
| Aqueous Phase | 0.4 | Trace | 53.2 | 43.4 |

The regenerated organic solvent is reused for the extraction of Zn chloride complex ion.

EXAMPLE 2

An industrial waste scattered from an electric furnace for melting iron scrap having the composition below was used as the starting material.

TABLE 4

| Zn-containing Industrial Waste Unit: Percent by Weight | | | | | | | |
|---|---|---|---|---|---|---|---|
| Zn | Fe | Ca | Pb | Al | Sn | Cr | Si |
| 19.4 | 31.8 | 2.5 | 3.0 | 0.4 | 0.5 | 0.2 | 2.2 |

The dust shown in Table 4 was dissolved in $H_2SO_4$. NaCl was added thereto, and the concentration was adjusted. Thus the starting solution for the extraction was prepared. The composition of the solution is shown in Table 5.

On the dissolution and the adjustment, iron metal powder was added so as to prevent oxidation of Fe ion. $Fe^{2+}$ ion was identified by measurement of the redox potential.

TABLE 5

| | Starting Solution for Extraction of Chloride Complex of Zinc | | | | |
|---|---|---|---|---|---|
| | Unit: g/l | | | | |
| | Total $H_2SO_4$ | Total Na | Total HCl | Zn | Fe |
| (a) | 238.5 | 106.9 | 167.3 | 31.0 | 56.8 |
| (b) | 201.7 | 38.8 | 60.7 | 26.2 | 48.0 |

The organic solvents used were TEHPO (tri-2-ethylhexylphosphine oxide) diluted with an aromatic hydrocarbon, and THPO (trihexylphosphine oxide) diluted with kerosine. The extraction conditions were: O/A = 1/1; 4-stage countercurrent contact; contact time of 5 minutes, temperature of 24°-25° C (room temperature).

TABLE 6

| Analysis of Raffinate Liquid | | | | |
|---|---|---|---|---|
| | Total $H_2SO_4$ | Total HCl | Zn | Fe |
| (a) TEHPO | | | | |
| Organic Phase | <0.1 | 36.7 | 31.0 | 0.5 |
| Aqueous Phase | 238.4 | 130.6 | 0.004 | 56.3 |
| (b) THPO | | | | |
| Organic Phase | <0.1 | 30.9 | 26.2 | <0.1 |
| Aqueous Phase | 201.7 | 29.8 | 0.009 | 48.0 |

Next, a test was conducted for scrubbing $FeCl_2$ which had been co-extracted into the organic solvent (a) at the extraction of chloride complex of Zn.

The scrubbing solution was an aqueous solution containing 58.1 g/l of Zn and 64.0 g/l of total Cl. O/A=10/1; 4-stage countercurrent contact; contact time of 5 minute; and temperature of 25° C. Table 7 shows the results.

TABLE 7

| Scrubbing Test | | | | |
|---|---|---|---|---|
| | Total $H_2SO_4$ | Total HCl | Zn | Fe |
| (a) TEHPO | | | | |
| Organic Phase | <0.001 | 44.2 | 36.5 | <0.001 |
| Aqueous Phase | 0.09 | 3.4 | 3.1 | 5.0 |

The inverse extraction test was conducted with the organic solvent containing Zn ion and Cl ion being brought into contact with water. The test was conducted by countercurrent contact by means of a separatory funnel. O/A=1.0/1.0; 10-stage countercurrent contact; contact time of 5 minutes; and temperature of 35°-45° C (warmed). Table 8 shows the result.

TABLE 8

| Inverse Extraction of Zn | | | | |
|---|---|---|---|---|
| | Total $H_2SO_4$ | Total HCl | Zn | Fe |
| (a) TEHPO | | | | |
| Organic Phase | <0.001 | 2.0 | 1.9 | <0.001 |
| Aqueous Phase | <0.001 | 42.1 | 34.6 | <0.001 |

To the raffinate liquid of Table 6, Fe ion and $HNO_3$ were added to convert $Fe^{2+}$ ion to $Fe^{3+}$ ion and simultaneously NaCl was added in an amount chemically equivalent to the $SO_4$ ion contained therein. Table 9 shows the analysis of the solution.

TABLE 9

| Starting Solution for Fe Extraction | | | | | |
|---|---|---|---|---|---|
| | Total $H_2SO_4$ | Total Na | Total HCl | Fe | $HNO_3$ |
| (a) | 198.7 | 89.1 | 108.8 | 50.1 | 20.1 |
| (b) | 180.1 | 84.5 | 104.6 | 50.7 | 15.9 |

The organic solvent sued for extraction of the chloride complex of Fe was TOPO (trioctylphospine oxide) diluted with kerosine. The extraction test conditions were: O/A=2/1; 10-stage countercurrent contact; and contact time of 5 minutes.

TABLE 10

| Fe Extraction Test | | | | | |
|---|---|---|---|---|---|
| | Total $H_2SO_4$ | Total Na | Total HCl | Fe | $HNO_3$ |
| (a) TOPO | | | | | |
| Organic Phase | <0.1 | <0.1 | 48.2 | 24.9 | 9.4 |
| Aqueous Phase | 198.7 | 89.1 | 12.4 | <0.1 | 1.3 |
| (b) TEHPO | | | | | |
| Organic Phase | <0.1 | <0.1 | 49.1 | 25.1 | 7.0 |
| Aqueous Phase | 180.0 | 84.5 | 6.4 | 0.6 | 1.9 |

Table 10 shows that, in the raffinate liquid from which the chloride complex of Fe had been extracted, sulfuric acid is approximately neutralized by the contained Na ion.

Next, a test was conducted for removing preferentially the $HNO_3$ having been extracted into the organic solvent together with Fe ion and Cl ion. The $HNO_3$ was removed by contact with a solution containing NaCl and $FeCl_3$.

The test was conducted by use of an aqueous solution containing 4.5 mol/l of NaCl and 0.8 mol/l of $FeCl_3$ under the condition: O/A=10/1; 6-stage countercurrent contact; and contact time of 5 minutes. Table 11 shows the result.

TABLE 11

| $HNO_3$ Scrubbing | | | | |
|---|---|---|---|---|
| | Total Na | Total $HNO_3$ | Total HCl | Fe |
| (a) TOPO | | | | |
| Organic Phase | <0.01 | <0.01 | 51.7 | 28.9 |
| Aqueous Phase | 103.5 | 93.9 | 168.7 | 3.8 |
| (b) TEHPO | | | | |
| Organic Phase | <0.01 | <0.01 | 56.1 | 29.0 |
| Aqueous Phase | 103.5 | 70.0 | 172.0 | 5.1 |

The organic solvents contained only Fe ion and Cl ion. The solvents can be regenerated in contact with water in a known manner through the inverse extraction of Fe ion and Cl ion to the aqueous phase.

In an optional process of the present invention, a sulfuric acid solution containing Zn ion is prepared in the manner below.

TABLE 12

| Composition of Starting Material Unit: Percent by Weight | | | | | | | |
|---|---|---|---|---|---|---|---|
| Zn | Fe | S | Pb | Cd | Cu | CaO | $SiO_2$ |
| 53.1 | 7.6 | 31.8 | 1.1 | 0.21 | 0.6 | 0.5 | 2.1 |

200 grams of the starting material was mixed with water containing 50 g/l of $H_2SO_4$ and 200 g/l of NaCl in an autoclave to give a slurry. The slurry was then transferred to a dissolving tank in which the slurry was dissolved at 75°-95° C with introduction of oxygen gas thereto to give a sulfuric acid solution containing Zn. The composition thereof is shown in Table 13.

TABLE 13

| Leaching Solution Unit: g/l | | | | | |
|---|---|---|---|---|---|
| Total $H_2SO_4$ | Total Na | Total HCl | Zn | Fe | Cu | Cd |
| 240.8 | 79.3 | 124.1 | 105.7 | 15.1 | 1.2 | 0.4 |

An iron scrap was added to the dissolved solution to eliminate copper. The solution containing Zn ion and Fe ion shown in Table 14 is the starting solution of extraction of chloride complex of zinc.

TABLE 14

| Starting Solution for Extraction Unit: g/l | | | | | | |
|---|---|---|---|---|---|---|
| Total H$_2$SO$_4$ | Total Na | Total HCl | Zn | Fe | Cu | Cd |
| 240.8 | 79.3 | 124.1 | 105.7 | 19.6 | <0.001 | 0.4 |

The extraction conditions are: O/A=3/1, 6-stage contact, contact time of 5 minutes, and TOPO diluted with an aromatic hydrocarbon as the organic solvent.

TABLE 15

| | Solution after Extraction Unit: g/l | | | | | | |
|---|---|---|---|---|---|---|---|
| | Total H$_2$SO$_4$ | Total Na | Total HCl | Zn | Fe | Cu | Cd |
| Organic Phase | 0.2 | <0.1 | 39.5 | 35.2 | <0.1 | <0.1 | 0.14 |
| Aqueous Phase | 240.2 | 79.3 | 5.7 | <0.001 | 19.6 | <0.001 | <0.001 |

To the raffinate liquid of Table 15, a solution containing 78 g/l of HNO$_3$ and 290 g/l of NaCl was added to convert Fe$^{2+}$ ion to Fe$^{3+}$ ion in a liquid. The liquid was brought into contact with an organic solvent comprising equal amounts of THPO (trihexylphosphine oxide) and TBPO (tributylphosphine oxide) diluted with kerosine to extract a chloride complex of Fe. Table 16 shows the result.

TABLE 16

| | Extraction of Fe | | | | |
|---|---|---|---|---|---|
| | Unit: g/l | | | | |
| | Total H$_2$SO$_4$ | Total Na | Total HCl | Total HNO$_3$ | Fe |
| Aqueous Phase before Extraction | 201.0 | 93.6 | 57.4 | 13.1 | 16.3 |
| Aqueous Phase after Extraction | 200.6 | 93.6 | 20.9 | <0.1 | <0.1 |
| Organic Phase after Extraction | 0.4 | <0.01 | 36.5 | 12.7 | 16.3 |

As shown in the above Table, the raffinate liquid from extraction of the chloride complex of Fe was approximately neutralized. Both the sulfuric acid used for dissolution and sulfur in the starting material were neutralized without using an expensive alkali such as NaOH, Na$_2$CO$_3$, NH$_3$ and NH$_4$OH and also without using Ca(OH)$_2$ or CaCO$_3$ which is inexpensive but lowers the yield of Zn by forming a precipitate like gypsum.

What is claimed is:

1. A method for neutralizing an acid solution containing sulfuric acid (H$_2$SO$_4$) and predominantly Zn ions, comprising adding, to the acid solution, at least one compound selected from the group consisting of chlorine-containing compounds of Na ion, K ion, Mg ion, Ca ion, and NH$_4$ ion in an amount at least chemically equivalent to the amount of SO$_4$ ion contained in the acid solution; and then bringing the acid solution into contact with an organic solvent selected from the group consisting of oxygen-containing organic solvents, alkylamine organic solvents or combinations thereof, to extract the Zn ions from the acid solution as a chloride complex of the organic solvent.

2. A method for neutralizing an acid solution containing sulfuric acid (H$_2$SO$_4$) and predominantly Zn ions and Fe ions, and additionally one or more metallic ions coexisting therein, comprising a first step of adding, to the acid solution, at least one compound selected from the group consisting of chlorine-containing compounds of Na ion, K ion, Mg ion, Ca ion and NH$_4$ in an amount at least chemically equivalent to the amount of SO$_4$ ion contained in the acid solution; and then bringing the acid solution into contact with a first organic solvent A selected from the group consisting of oxygen-containing organic solvents, alkylamine organic solvents or combinations thereof, to extract the Zn ions from the acid solution as a first chloride complex with the organic solvent A; and a second step of converting Fe$^{2+}$ ion to Fe$^{3+}$ ion in a raffinate sulfuric acid solution remaining from the first step, by addition of an oxidizing agent or by an electrochemical means, and then bringing the raffinate sulfuric acid solution into contact with a second organic solvent B from the group consisting of oxygen-containing organic solvents, alkylamine organic solvents or combinations thereof, to extract Fe ion from the sulfuric acid solution as a second chloride complex with the second organic solvent B.

3. The method of claims 1 or 2, wherein the acid solution is derived from a natural raw material containing mainly ZnS by dressing and concentrating the natural raw material, adding sulfuric acid or water thereto to make a slurry, and dissolving the slurry by addition of an oxygen-containing gas under atmospheric pressure or a high pressure.

4. The method of any one of the claims 1, 2, or 3 wherein the sulfuric acid solution is derived by treating a Zn-containing natural raw material, an industrial waste, or a zinc-galvanized product with sulfuric acid solely or with sulfuric acid and at least one compound selected from the group consisting of chlorine-containing compounds of Na, K, Mg, and NH$_4$ to dissolve Zn.

5. The method of claims 1 or 2, further comprising adding a liquid or solid substance containing Zn, or Zn and Fe to the acid solution in the case where the quantity of Zn and Fe contained in the acid solution is less than the sum of the quantities of SO$_4$ combined to Fe and Zn, and SO$_4$ in a free state.

6. The method of claim 2, wherein the chlorine-containing compound is added in an amount necessary for forming a chloride complex with the Zn ions contained in the acid solution to the acid solution before extraction of the chloride complex of zinc; and at least one compound selected from the group consisting of chlorine-consisting compounds of Na, Mg, Ca, K, and NH$_4$ is added in an amount necessary for neutralizing the SO$_4$ ion in the raffinate sulfuric acid solution after extraction of the first chloride complex from the acid solution and before extraction of the Fe ions in the second step.

7. The method of claims 1 or 2, further comprising contacting the organic solvent containing the extracted chloride complex of An with an aqueous solution containing one or more of the compounds selected from the group consisting of compounds of Na and Cl, Mg and Cl, NH$_4$ and Cl, and Zn and Cl, whereby any impurity other than Zn ion and Cl ion in the organic solvent is transferred to the aqueous solution.

8. The method of any one of claims 1, 2, 4 and 6, wherein the chlorine-containing Na compound is rock salt.

9. The method of claims 1 or 2, wherein the acid solution is prepared by employing a solid containing a sulfide of Zn as an anode, and an aqueous solution containing one or more of the compounds selected from the group consisting of chlorides and sulfates of Na, K, NH$_4$, and Mg as an anolyte.

10. The method of claim 7 wherein the compound of Na and Cl is rock salt.

* * * * *